(12) United States Patent
Kim

(10) Patent No.: US 9,253,381 B2
(45) Date of Patent: Feb. 2, 2016

(54) CAMERA MODULE HAVING ROTATION PREVENTION MEANS

(75) Inventor: Duhee Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 12 days.

(21) Appl. No.: 13/996,854

(22) PCT Filed: Dec. 21, 2011

(86) PCT No.: PCT/KR2011/009909
§ 371 (c)(1),
(2), (4) Date: Jun. 21, 2013

(87) PCT Pub. No.: WO2012/087013
PCT Pub. Date: Jun. 28, 2012

(65) Prior Publication Data
US 2013/0286284 A1    Oct. 31, 2013

(30) Foreign Application Priority Data
Dec. 24, 2010   (KR) .................. 10-2010-0134636

(51) Int. Cl.
*H04N 5/225*   (2006.01)
*H04N 5/232*   (2006.01)

(52) U.S. Cl.
CPC ........... *H04N 5/2254* (2013.01); *H04N 5/2257* (2013.01); *H04N 5/2328* (2013.01); *H04N 5/23258* (2013.01)

(58) Field of Classification Search
USPC ................................. 348/208.4–7
See application file for complete search history.

(56) References Cited

U.S. PATENT DOCUMENTS

| 7,520,685 | B2 * | 4/2009 | Lee ............................... 396/427 |
| 2009/0039734 | A1 * | 2/2009 | Takahashi et al. ........ 310/323.02 |
| 2009/0303594 | A1 * | 12/2009 | Lim et al. ..................... 359/554 |
| 2009/0310959 | A1 * | 12/2009 | Shih et al. .................... 396/529 |
| 2011/0013076 | A1 * | 1/2011 | Ko ............................... 348/373 |
| 2011/0075280 | A1 * | 3/2011 | Chou et al. .................... 359/824 |
| 2011/0292273 | A1 | 12/2011 | Kim et al. |
| 2011/0310248 | A1 | 12/2011 | McElroy et al. |

(Continued)

FOREIGN PATENT DOCUMENTS

| JP | 2007-041455 A | 2/2007 |
| KR | 20-0151465 Y1 | 7/1999 |
| KR | 10-2010-0068804 A | 6/2010 |
| TW | M271324 | 7/2005 |
| TW | M412384 | 9/2011 |

OTHER PUBLICATIONS

Office Action, dated Jan. 8, 2014, in Taiwanese Application No. 100148272.

(Continued)

*Primary Examiner* — Shahbaz Nazrul
(74) *Attorney, Agent, or Firm* — Saliwanchik, Lloyd & Eisenschenk

(57) ABSTRACT

The present invention relates to a camera module configured to prevent de-focusing during correction of hand-shake, and to prevent damages to devices during correction of hand-shake, the module including: a module part including a lens assembly formed with at least one or more lenses, an image sensor having an image pickup device for converting light concentrated through the lens to an electrical signal, and a PCB (Printed Circuit Board) mounted with the image sensor; a case supporting the module part by accommodating the module part; a driving part tilting the module part; and a rotation preventing part preventing the module part from rotating on a vertical axis.

8 Claims, 3 Drawing Sheets

(56) References Cited

U.S. PATENT DOCUMENTS

| | | | |
|---|---|---|---|
| 2012/0092551 A1* | 4/2012 | Ohishi et al. | 348/374 |
| 2012/0154671 A1* | 6/2012 | Ohishi et al. | 348/357 |
| 2013/0083235 A1* | 4/2013 | Jacobsen et al. | 348/360 |
| 2013/0114952 A1* | 5/2013 | Kim et al. | 396/533 |

OTHER PUBLICATIONS

International Search Report in International Application No. PCT/KR2011/009909, filed Dec. 21, 2011.

* cited by examiner

CAMERA MODULE HAVING ROTATION PREVENTION MEANS

CROSS-REFERENCE TO RELATED APPLICATIONS

This application is the U.S. national stage application of International Patent Application No. PCT/KR2011/009909, filed Dec. 21, 2011, which claims priority to Korean Application No. 10-2010-0134636, filed Dec. 24, 2010, the disclosures of each of which are incorporated herein by reference in their entirety.

TECHNICAL FIELD

The teachings in accordance with exemplary embodiments of this invention relate generally to a camera module, and more particularly to a camera module configured to convert an optical image of an object incident through a lens to an electrical signal in an image sensor chip.

BACKGROUND ART

Recently, demands on a small-sized compact camera module are on the increase for use in various multimedia fields including notebook type personal computers, camera phones, PDAs (Personal Digital Assistants), smart phones and toys, and in image input equipment including monitoring cameras and information terminals for video tape recorders.

Generally, the compact camera module is applied to portable communication devices including camera phones, PDAs (Personal Digital Assistants) and smart phones and to various IT (Information Technology) devices.

The camera module is generally manufactured using an image sensor or a photo-electric conversion device of a CCD (Charge Coupled Apparatus) type or a CMOS (Complementary Metal Oxide Semiconductor) type to converge light from an object to a photosensitive element, to form an image of the object and display the image on a display device.

Furthermore, the camera module is manufactured to enable a focus adjustment for adjusting a size of an image, where a driving source is installed and a plurality of lenses is moved to change a relative distance for adjustment of an optical focal length.

At this time, when a user attempts to capture an image, a focus of the camera module is blurred by vibration of the user's hands, and therefore a reduction in the quality of a captured image may occur. That is, when there is vibration in a user's hands which hold the camera module, the subject image moves to a different location and therefore the focus of the camera vibrates, so that the phenomenon of blurring of the subject image may occur.

A hand-shake correction mechanism is a device applied to preventing a reduction in the quality of a captured image caused by hand-shake during photographing. A conventional hand-shake correction mechanism was mainly used for a digital camera. This is because a large-sized camera module is easier in application of the hand-shake correction mechanism than a compact-sized camera module used for mobile phones.

However, concomitant with demands requiring a high quality image in a compact-sized camera module as that of a digital camera, a hand-shake correction mechanism has been applied to mobile compact-sized camera module, and as a result, attempts at developing and researching the hand-shake correction mechanism have been actively made.

The conventional hand-shake correction mechanism can be generally classified into four categories: that is, a hand-shake correction optical lens moving method, an image sensor moving method, a prism refraction method, and camera module tilting method.

FIGS. 1 and 2 are perspective views illustrating a hand-shake correction camera module by the typical tilting method.

Referring to FIGS. 1 and 2, a module part (10), which is an image sensor converting an optical signal to an electrical signal, includes a lens assembly formed with a plurality of lenses for concentrating light, a cover encasing the lens assembly and a PCB (Printed Circuit Board) processing a signal from the image sensor.

The module part (10) is inserted into a case (20) to tilt in response to movement of a moving part, where the module part (10) tilts to 'a' direction and 'b' direction in response to movement of the module part (10) caused by hand-shake. At this time, referring to FIG. 2, the module part (10) may tilt to only one direction of 'a' direction or 'b' direction, but largely tilts to both directions because the hand-shake mostly occurs three dimensionally.

However, a rotational movement to 'c' direction (rotation of module part, 10) may occur during tilting movement, and in this case, a focus is disadvantageously warped to correct the hand-shake. On top of that, there may occur problems such as damages to the module part (10) and the case (20) caused by contact with the case (20) during rotating movement of the module part (10) and damages to the moving part (10) caused by excessive rotating movement of the module part (10).

DISCLOSURE OF INVENTION

Technical Problem

Accordingly, the present invention has been made keeping in mind the above problems occurring in the prior art, and an object of the present invention is to implement a camera module configured to prevent de-focusing during correction of hand-shake.

Another object of the present invention is to implement a camera module configured to prevent damages to devices during correction of hand-shake.

Technical problems to be solved by the present invention are not restricted to the above-mentioned, and any other technical problems not mentioned so far will be clearly appreciated from the following description by skilled in the art.

Solution to Problem

In order to accomplish the above objects, the present invention provides a camera module, the camera module comprising: a module part including a lens assembly formed with at least one or more lenses, an image sensor having an image pickup device for converting light concentrated through the lens to an electrical signal, and a PCB (Printed Circuit Board) mounted with the image sensor; a case supporting the module part by accommodating the module part; a driving part tilting the module part; and rotation preventing means preventing the module part from rotating on a vertical axis.

Furthermore, the rotation prevention means may include a lug protrusively formed at one side of the module part and having a predetermined height, and a groove part formed at the case for the lug to be inserted.

Furthermore, the groove part may be formed between two supports protrusively formed at an inner side of the case.

Furthermore, the groove part may be formed by depression of the inside of the case.

Furthermore, the groove part may be so formed as to prevent the lug from moving horizontally only, while not preventing a tilting movement of the module part.

Furthermore, the lug and the groove part may be discretely formed at a predetermined space apart.

Furthermore, the rotation prevention means may be formed in plural number.

Furthermore, the rotation prevention means may include a lug formed at the case, and a groove part formed at the module part for the lug to be inserted.

Advantageous Effects of Invention

A camera module according to the present invention has an advantageous effect in that de-focusing and damages to devices are prevented by preventing rotation movement of a module part during hand-shake correction using tilting method, whereby stable and reliable screen quality and devices can be guaranteed.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

Figure 1:
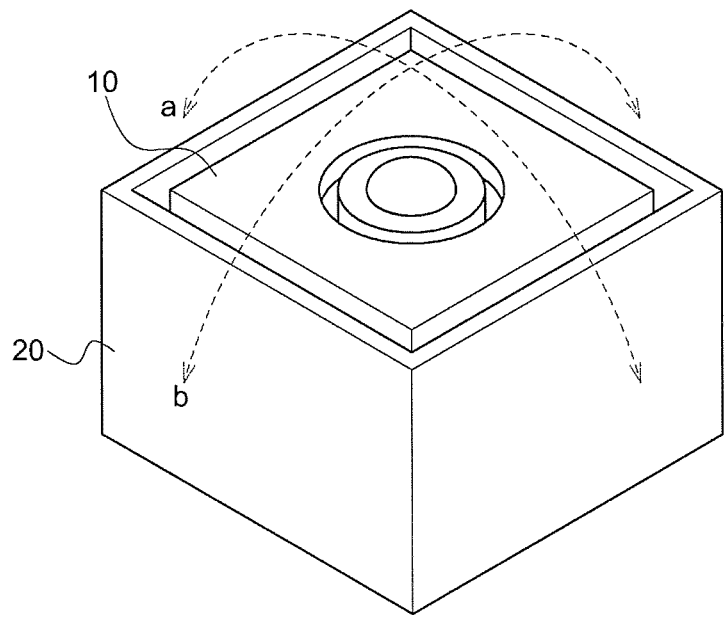
FIGS. 1 and 2 are perspective views illustrating a hand-shake correction camera module by the typical tilting method.
Figure 2:
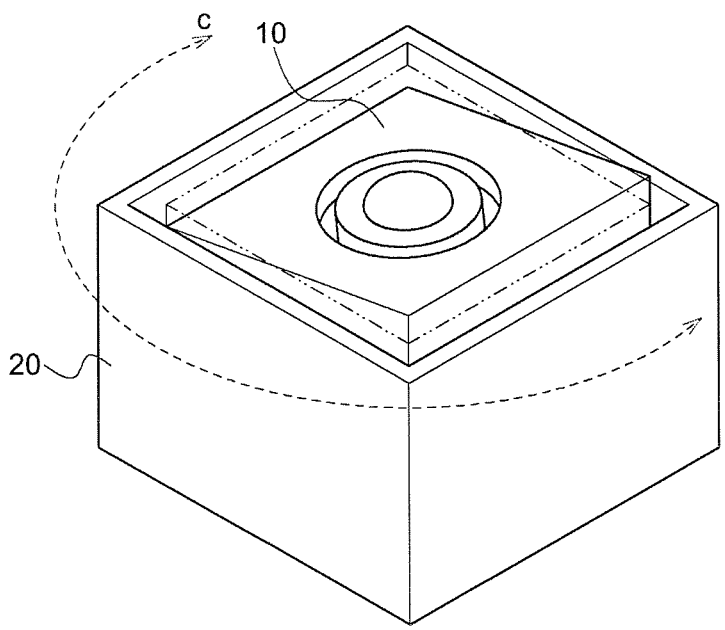

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-7 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thereafter," "then," "next," "therefore", etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Now, the camera module according to exemplary embodiments of the present invention will be described in detail with reference to the accompanying drawings.

Figure 3:
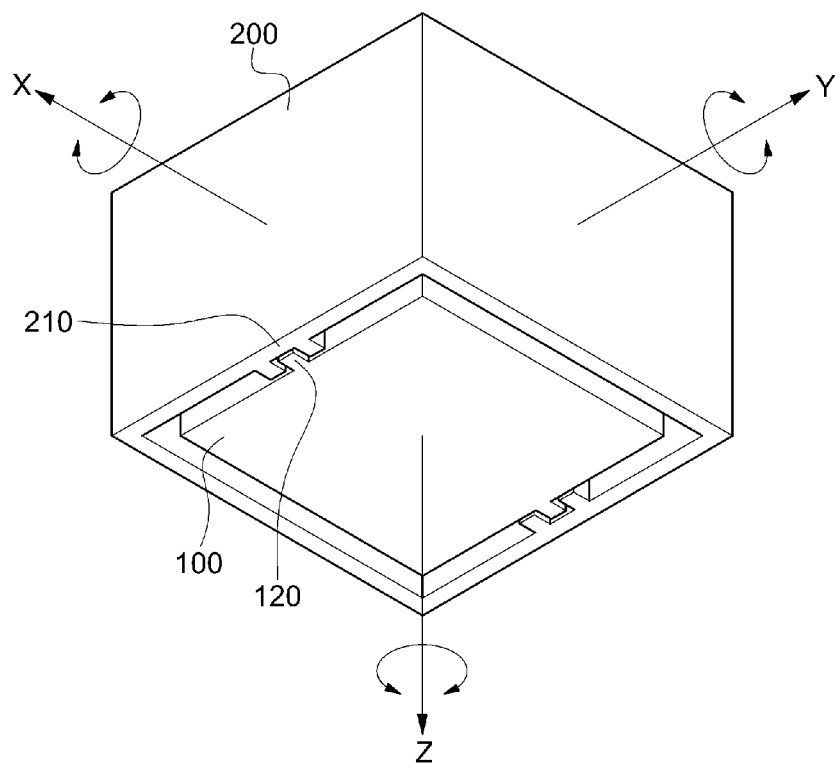
FIG. 3 is a perspective view illustrating a camera module from a bottom surface side according to an exemplary embodiment of the present invention.
Figure 4:
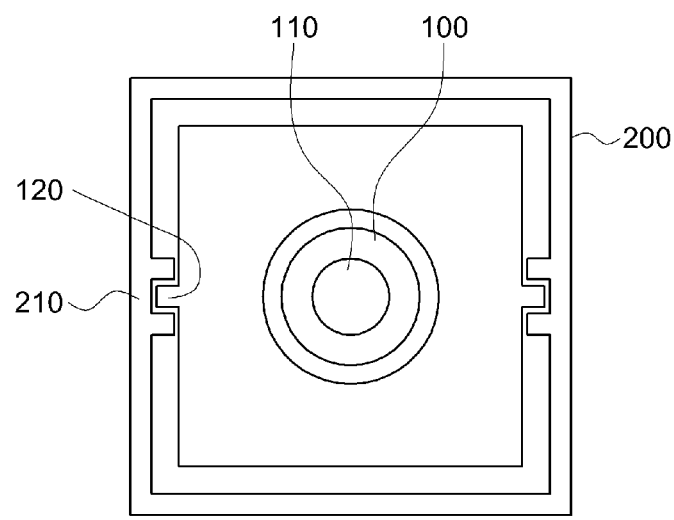
FIG. 4 is a plan projection of a camera module according to an exemplary embodiment of the present invention.
Figure 5:
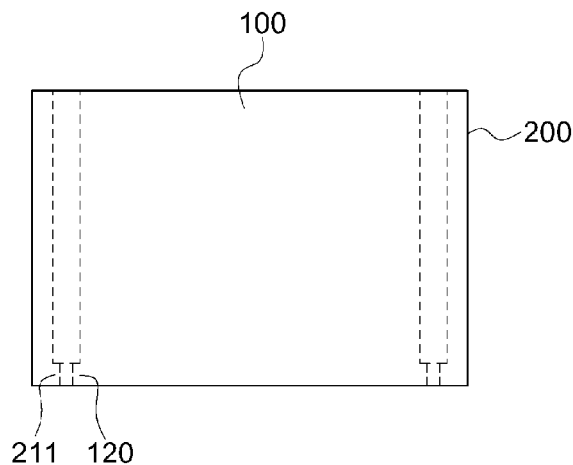
FIG. 5 is a lateral projection of a camera module according to an exemplary embodiment of the present invention.
Figure 6:
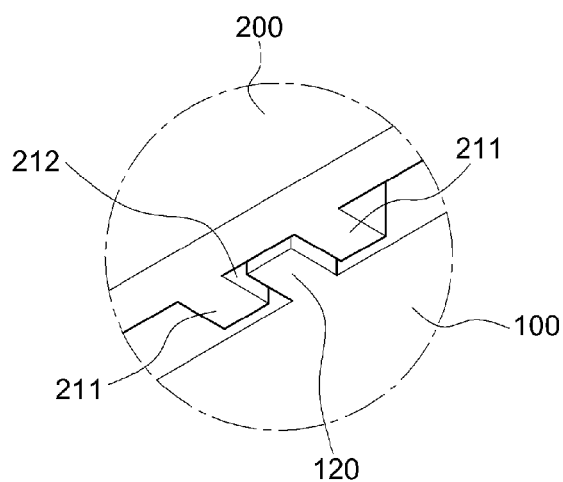
FIG. 6 is a partially enlarged view of a rotation prevention part of a camera module according to an exemplary embodiment of the present invention.

FIG. 3 is a perspective view illustrating a camera module from a bottom surface side according to an exemplary embodiment of the present invention, FIG. 4 is a plan projection of a camera module according to an exemplary embodiment of the present invention, FIG. 5 is a lateral projection of a camera module according to an exemplary embodiment of the present invention, and FIG. 6 is a partially enlarged view of a rotation prevention part of a camera module according to an exemplary embodiment of the present invention.

A camera module according to an exemplary embodiment of the present invention includes a module part (100), a case (200) and a driving part.

The module part (100) includes a lens assembly (110), a PCB (Printed Circuit Board), an image sensor and a cover. The lens assembly includes at least one or more lenses and the image sensor mounted in the PCB converts light concentrated through the lens to an electrical signal.

The PCB (Printed Circuit Board) mounted with the image sensor processes the electrical signal, and the lens assembly, the PCB and the image sensor are accommodated inside the cover. The module part (100) is inserted into the case (200), where the module part (100) is not fixed inside the case (200) but movably arranged inside the case (200). The case (200) is formed at one side with the driving part to tilt the module part (100) to x axis and y axis direction (see FIG. 3).

Each lateral bottom side of the module part (100) is protrusively formed with a lug (120) at a predetermined height, and a concave groove part (210) is formed at each inner side of the case corresponding to the lug (120).

The concave groove part (210) includes two protrusive prevention parts (211), a groove part (212) is formed between the two protrusive prevention parts (211). The lug (120) is positioned at the groove part (212) between the two protrusive prevention parts (211), whereby a horizontal movement of the lug (120) is prevented by the prevention part (211). Therefore, the module part (100) integrally formed with the lug (120) is prevented from a horizontal rotation, that is, unintentional rotation to z axis direction, but is allowed to tilt only to x axis and y axis.

Then, due to the fact that the module part (100) tilts, the lug (120) needs a vertical movement inside the groove part (212). Furthermore, in a case the prevention part (211) is closely brought into contact with the lug (120) to completely prevent rotation of the module part (100), there may occur a problem in which the tilting driving of the module part (100) is hampered by friction force between the prevention part (211) and the lug (120).

Therefore, there should be a sufficient tolerable space between the lug (120) and the prevention part (211) and between the lug (120) and the case (200) facing the case (200). That is, the size of the groove part (212) must be large enough to allow tilting by the module part (100). Thus, the lug (120) and prevention part (211) facing the lug (120), and the lug (120) and an inner surface of the case (200) facing the lug (120) must be discretely arranged at a predetermined space apart.

Furthermore, rotation prevention means according to an exemplary embodiment of the present invention may include a lug protrusively formed at the case, and a groove part formed at the module part for the lug to be inserted.

Mode for the Invention

Figure 7:
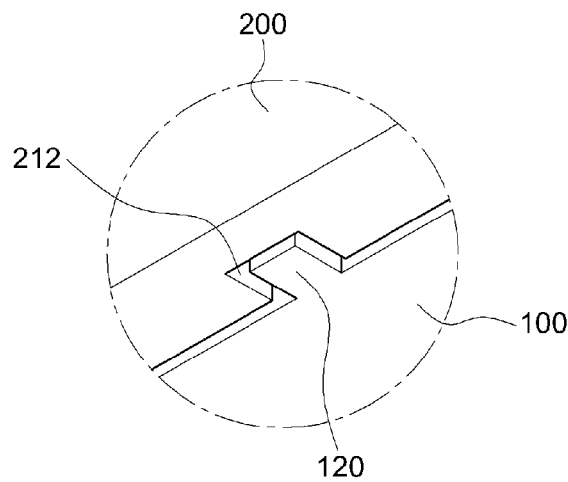
FIG. 7 is partially enlarged view of a rotation prevention part of a camera module according to another exemplary embodiment of the present invention.

Meanwhile, FIG. 7 is partially enlarged view of a rotation prevention part of a camera module according to another exemplary embodiment of the present invention, where the case (200) is not formed with protruding prevention part (211) but only formed with depressed groove part (212), and the lug (120) is insertedly arranged inside the groove part. Therefore, the rotation to z axis is prevented, and tilting movement to x axis and y axis is only allowed, even though there is no the prevention part (211) as in the exemplary embodiment of the present invention.

Although FIGS. 3 to 7 have schematically and briefly illustrated the camera module where the configuration of the module part (100) being coupled to the case (200) is omitted, this is for convenience of explanation with regard to the inventive concept of the present invention, and the module part (100) is positioned inside the case to prevent from being disengaged from the case (200).

The camera module according to the exemplary embodiment of the present invention is mounted on portable terminals such as smart phones or portable IT devices to allow photographing an image, and rotation to z axis direction by the module part (100) is prevented by the concave groove part (210) and the lug (120), such that compensation movement can be accurately transmitted during hand-shake caused by trembling.

In addition, contact between the module part (100) and the case (200) can be prevented during rotation of the module part (100), whereby damages thereto can b be prevented, and damages to the driving part (300) and devices can be prevented that may be generated by excessive horizontal rotating movement of the module part (100).

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The camera module according to the present invention has an industrial applicability in that de-focusing and damages to devices are prevented by preventing rotation movement of a module part during hand-shake correction using tilting method.

The invention claimed is:

1. A camera module, the camera module comprising:
   a module part including a lens assembly formed with at least one lens, an image sensor having an image pickup device for converting light concentrated through the lens to an electrical signal, and a PCB (Printed Circuit Board) mounted with the image sensor;
   a case supporting the module part by accommodating the module part;
   a driving part tilting the module part; and
   a rotation prevention unit inhibiting the module part from rotating but allowing tilting with respect to the case,
   wherein the rotation prevention unit includes protrusive prevention parts disposed on the case, a lug protrusively formed at the module part and positioned between the protrusive prevention parts, and a groove part disposed on the case for the lug to be inserted into.

2. The camera module of claim 1, wherein the lug is formed at one side of the module part and has a predetermined height to be received within the groove part.

3. The camera module of claim 2, wherein the groove part is formed between two protrusive prevention parts formed at an inner side of the case.

4. The camera module of claim 2, wherein the groove part is formed by depression of the inside of the case.

5. The camera module of claim 2, wherein the groove part is so formed as to prevent the lug from moving horizontally only, while not preventing a tilting movement of the module part.

6. The camera module of claim 2, wherein the lug and the groove part are discretely formed at a predetermined space apart.

7. The camera module of claim 6, wherein the rotation pr prevention unit is formed in plural number.

8. A camera module, comprising:
- a module part including a lens assembly formed with a lens, an image sensor having an image pickup device for converting light concentrated through the lens to an electrical signal, and a Printed Circuit Board mounted with the image sensor;
- a case supporting the module part by accommodating the module part;
- a driving part tilting the module part;
- a groove formed at an inner side of the case; and
- a lug protrusively formed at the module part and positioned at the groove,
- wherein a top side and a bottom side of the groove are open, and
- wherein a rotation prevention unit is formed by the lug engaged in the groove to inhibit the module part from rotating while allowing tilting with respect to the case.

* * * * *